H. L. BEACH.
STARTING DEVICE FOR AUTOMOBILES.
APPLICATION FILED MAR. 20, 1913.
1,175,333.
Patented Mar. 14, 1916.
2 SHEETS—SHEET 1.
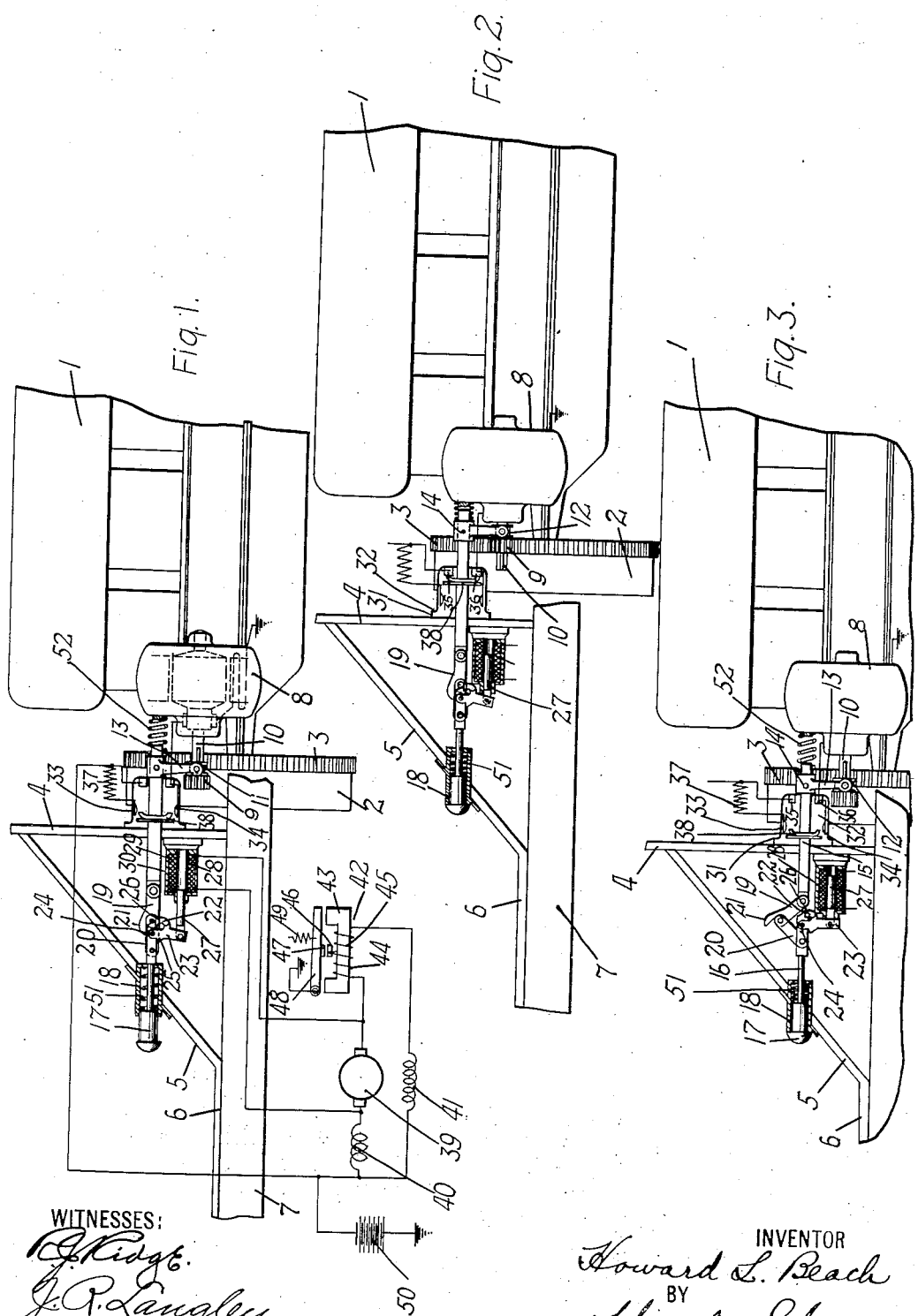
WITNESSES:
INVENTOR
Howard L. Beach
BY
Wesley G. Carr
ATTORNEY

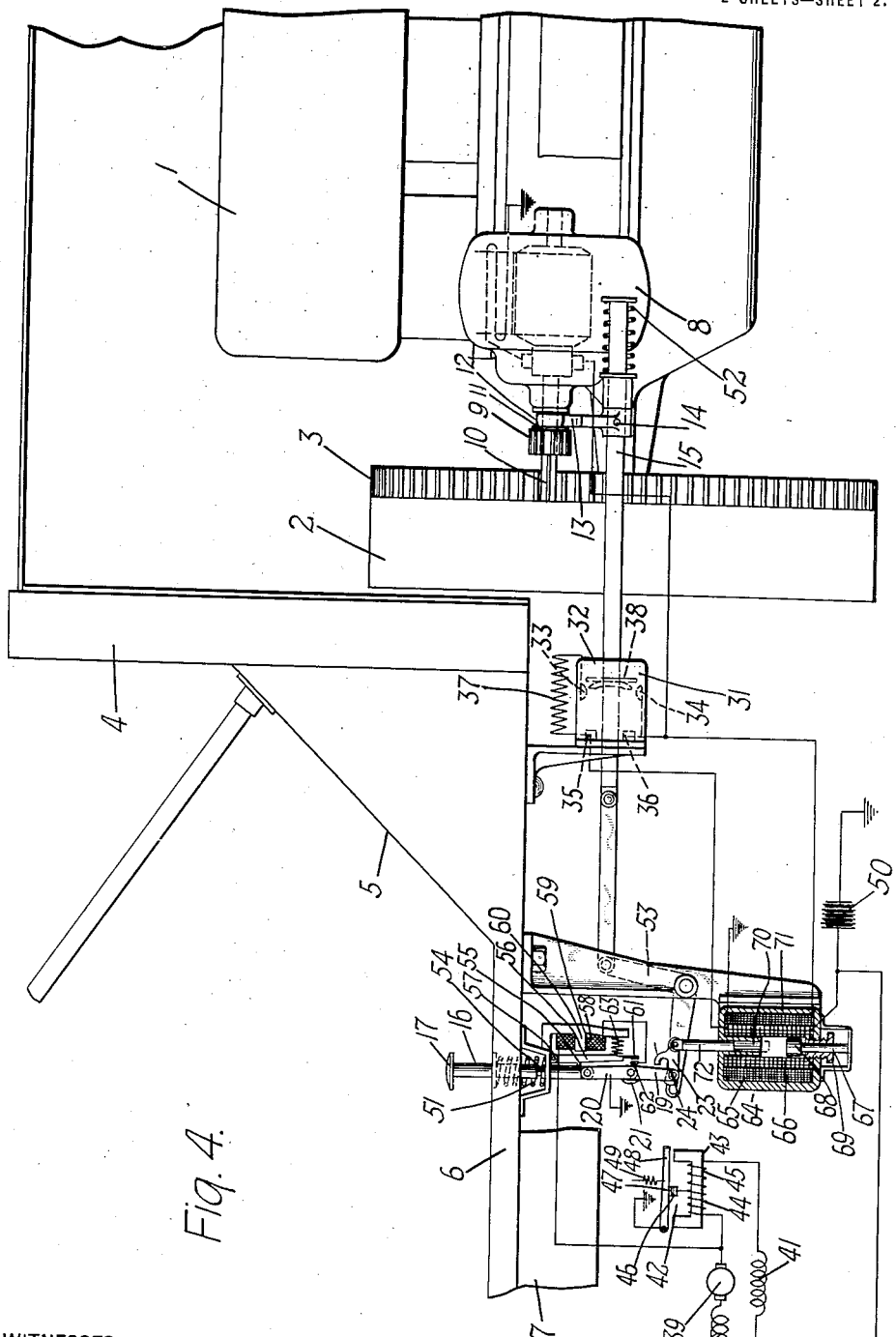

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

STARTING DEVICE FOR AUTOMOBILES.

1,175,333.     Specification of Letters Patent.     Patented Mar. 14, 1916.

Application filed March 20, 1913. Serial No. 755,778.

*To all whom it may concern:*

Be it known that I, HOWARD L. BEACH, a citizen of the United States, and a resident of Edgewood Park, in the county of Allegheny and State of Pennsylvania, have invented a new and useful Improvement in Starting Devices for Automobiles, of which the following is a specification.

My invention relates to starting devices for automobiles, and it has particular reference to a safety mechanism such as may be employed in connection with starting motors for automobiles or other motor vehicles.

My invention has for its object to provide a mechanism of the above indicated character which automatically prevents the operative connection of the motor to the engine shaft of an automobile while the engine shaft is rotating above a predetermined speed.

In the use of starting motors in connection with gas engines, it has been customary to employ reduction gear mechanism which operatively connects the motor to the fly wheel of the engine. In case the operator should attempt to mesh a connecting gear wheel with the fly wheel gear, while the engine is running, the act is practically certain to result in "stripping" or breaking the gear teeth of the connecting mechanism. My invention provides a means for preventing the meshing of the connecting gear wheels when the engine is running above a predetermined speed.

My invention is described in detail in connection with the accompanying drawings in which—

Figure 1 is a view, partially in elevation and partially in section, of a portion of an automobile with my invention applied thereto, the electrical connections being shown diagrammatically. Figs. 2 and 3 are similar views showing parts in different relative positions, the electrical connections being for the most part omitted. Fig. 4 is a view, similar to Fig. 1, of a modification of my invention.

The automobile structure comprises an engine 1, a fly wheel 2, provided with gear teeth 3, a dashboard 4, a foot board 5, a floor 6 and a chassis 7. An electric motor 8 is attached to the crank case of the engine in any suitable manner. A pinion 9 is slidably mounted on the motor shaft 10 and is adapted to be shifted into and out of mesh with the gear teeth 3 on the fly wheel. The pinion 9 has an integral collar 11 that is provided with a groove 12 to be engaged by the arms 13 of a yoke member 14. The member 14 is fixed on a shaft 15 which extends through a suitable opening in the dashboard 4. A push rod 16 is provided with a head 17, and has a slidable bearing in a cylindrical tube 18 that is fixed in a suitable opening in the foot board 5. The rod 16 is connected to the shift rod 15 by a toggle joint comprising two pivotally connected links 19 and 20 which are pivotally connected to the push rod 16 and the shift rod 15, respectively. The link 19 is provided with a projecting shoulder 21 which acts as a stop to limit the pivotal movement of the links 19 and 20 in one direction. A lever 23 has a pivotal support at 24 on the push rod 16 and is provided with an arm 22 to engage the link 19 and with two shoulders 25 and 26 to act as stops to limit its pivotal movement. The lever 23 is pivotally connected to the movable core 27 of an electromagnet 28. The magnet 28 comprises a winding 29 and a casing 30 that is fixed to the dashboard 4.

A switch 31 is mounted on the dashboard 4 and comprises a casing 32, contact clips 33 and 34 and contact members 35 and 36. The contact clip 33 is connected to the contact member 35 through a resistor 37, and the contact clip 34 is connected to the contact member 36. The movable member 38 of the switch is mounted on the shift rod 15 and is adapted to control certain electric circuits in accordance with the position of the pinion 9, as hereinafter described. The details of the switch 31 form no part of the present invention and any other suitable switching mechanism may be substituted therefor.

As diagrammatically shown in Fig. 1, a generator 39, which may be operatively connected to the engine shaft in any suitable manner (not shown), is provided with a series field winding 40 and a shunt field winding 41. An automatic cut-out 42 is provided with a core 43 upon which are two windings 44 and 45 that are in series with the series field winding 40 and the shunt field winding 41, respectively.

The windings 44 and 45 are connected to a contact member 46 that is adapted to be engaged by a contact member 47 carried by a movable armature 48 which is normally held up by a spring 49. A storage battery 50 furnishes the motor with power for starting the engine and is recharged by the generator when the engine is running.

The operation of the starting mechanism is as follows: When the engine is stationary and the parts are in the position shown in Fig. 1, the operator presses the head 17 of the push rod 16 against the action of a spring 51, and the shift rod 15 is thereby moved forwardly against the pressure of a spring 52. The core 27 of the electro-magnet is advanced into the winding 29 and the contact member 38 engages contact clips 33 and 34 to complete a circuit from the battery 50, which is grounded on one side, through the resistor 37, contact clip 33, contact member 38, contact clip 34, and contact member 36, to the motor 8, which has one terminal grounded. The motor then rotates slowly, owing to the comparatively high resistance in the circuit. The further advance of the shift rod 15 breaks the preliminary contact of the switch members 33, 34 and 38, and the pinion 9 is shifted into mesh with the fly wheel gear teeth 3 while the pinion is rotating slowly, but with no torque on the motor. At the limit of the shifting movement, the movable contact member 38 engages the contact members 35 and 36 and completes the running circuit of the motor which is the same as the circuit above described except that the resistor 37 and the contact clips 33 and 34 are cut out. The various parts are then in the positions shown in Fig. 2, in which the motor operates to start the engine for operation under its own power. The generator is then operated by the engine and current flows through the winding 29 of the electro-magnet 28 which is connected across the generator terminals. When a predetermined speed is reached, the winding 29 is energized to draw the core 27 inwardly sufficiently to trip the toggle 19—20 by means of the lever 23. The spring 52 then shifts the rod 15 to disengage the pinion 9 and the gear teeth 3 and to disconnect the several contact members of the switch 31 and thus break the motor circuit, the various parts assuming the positions shown in Fig. 3. The push rod 16 is held in its inner or inoperative position by the magnet 28, the winding 29 being energized as long as the generator is in operation.

When the generator attains a predetermined speed, the windings 44 and 45 are sufficiently energized to draw the armature 48 downwardly to connect the contact members 46 and 47 and complete the charging circuit which extends from the battery 50, through the series field winding 40, the armature of the generator 39, the winding 44, the contact members 46 and 47, to ground and back to the battery. The above described positions of the contact members 46 and 47 are maintained until the generator speed is decreased to such an amount that the battery voltage exceeds that of the generator, whereupon the current is reversed through the charging circuit which includes the series winding 44. The windings 44 and 45, which normally assist each other, are then opposed and the pull of the magnet is weaker than that of the spring 49. Consequently the armature 48 is drawn upwardly by the spring 49 and the charging circuit is broken. When the generator voltage decreases to a predetermined value, the magnet winding 29 is sufficiently de-energized to allow the spring 51 to shift the push rod 16 into the position shown in Fig. 1 and thereby close the toggle joint ready for starting, when the same cycle of operations may be repeated. It will be readily understood that, when the push rod 16 is in the position of Fig. 3, the operator can not actuate the shift rod 16 to effect the engagement of the pinion 9 and the fly-wheel gear teeth 3. This inoperative position of the push rod 16 is maintained during the operation of the engine and the generator at a speed which generates a sufficient voltage to energize the magnet winding 29 to overcome the force of the spring 51.

A modification of the above described mechanism is shown in Fig. 4 in which the same numerals are used to designate like parts. In this form of my invention, the push rod 16 and the toggle joint are mounted in a vertical position and are connected to the shift rod 15 by a bell crank lever 53. The push rod 16 is provided with an annular groove 54 to be engaged by a dog 55 on an armature 56. The armature 56 has a pivotal support at 57 and is controlled by an electro-magnet 58. The magnet 58 comprises a winding 59 and a core member 60. The armature 56 bears a contact member 61 which engages a contact member 62 when the armature 56 is actuated by a spring 63 to engage the groove 54. The lever 23 is controlled by a lock-out electro-magnet 64 having two windings 65 and 66 which are respectively in shunt and in series with the motor 8, and are wound to assist each other. The magnet 64 is provided with a movable core member 67 having an enlarged head 68 which reciprocates between a plug 69 and the end of a cylindrical tube 70 which may be integral with the casing 71. A plunger 72 is connected to the lever 23 and is adapted to reciprocate in the tube 70. The magnet operates as a lock-out coil to prevent the actuation of the lever 23 when the combined effect of the windings exceeds a predetermined amount.

In describing the operation of the modification shown in Fig. 4, those details are omitted which correspond to the operation of the first form of my invention. When the operator presses the push rod 16 downwardly, the switch 31 makes the connections which are above described, the pinion 9 is meshed with the gear teeth 3 of the flywheel, the plunger 72 is advanced into the tube 70 to the dotted line position shown, and the spring 63 actuates the armature 56 to engage the groove 54 by means of the dog 55. The dog 55 acts as a latch to hold the push rod 16 in its downward position until released as later described. The movement of the armature 56 connects the contacts 61 and 62 and completes a circuit from the ungrounded side of the battery 50, through the series field winding 40, the armature of the generator 39, the magnet winding 59, the contacts 62 and 61, and the armature 56 to ground, through the frame of the vehicle. A second circuit is completed from the ungrounded side of the battery through the winding 66, the contact member 34 of the switch 31, and the motor to ground. The coil 65, which is connected to the circuit last traced, between the switch 31 and the motor 8, and which is in parallel with the motor, is also energized by the battery.

The magnet winding 59 is not fully energized by the connection above described because the motor receives a heavy current at starting, causing a large drop in potential in the motor circuit which is in parallel with the circuit of the magnet. This drop in potential, together with the high resistance of the magnet winding, renders the pull of the magnet insufficient to overcome the pressure of the spring 63. As the motor speeds up and the current grows smaller, because of the counter electro-motive force of the motor, the generator voltage increases and opposes the battery voltage. Thus, the magnet winding is not subjected to the full voltage of the battery while the motor and the generator are running. The lock-out magnet 64 cannot operate to trip the toggle joint while the current is above a predetermined value, as an excessive current causes the magnetic saturation of the stem of the movable core 67, and sufficient magnetic flux flows across the air gap between the plug 69 and the head 68 of the core 67, to hold the core, by magnetic attraction, in its outer position. Flux also flows across the longer air gap between the head 68 of the core and the plunger 72, causing a magnetic attraction between these members which is not sufficient to overcome the attraction between the plug 69 and the head 68. As the motor speed increases and the counter-electromotive force rises in value, the current in the series coil 66 decreases and, when a predetermined value is reached, flux ceases to flow across the air gap between the plug 69 and head 68, the core 67 is drawn inwardly with a sharp movement and strikes the plunger 72 a blow sufficient to cause the latter to move upwardly and actuate the lever 23 to trip the toggle joint. The spring 52 then actuates the shift rod 15 to disengage the pinion 9 from the flywheel gear teeth 3 and to break the connections of the switch 31. The push rod 16 is held in its downward position by the armature 56 until the magnet winding is sufficiently energized to withdraw the armature, as hereinafter described.

When the generator speed increases to the predetermined amount, the automatic cutout connects the generator 39 and the battery 50 in series for charging. The connection of the cut-out contact members 46 and 47 short-circuits the magnet winding 59 by grounding its ungrounded terminal. When the operator stops the engine, the cut-out operates to break the circuit and to remove the short circuit around the magnet winding 59. When the generator voltage is very small or is zero, the battery voltage is unopposed and energizes the winding 59 to actuate the armature 56 and withdraw the dog 55 from the groove 54, whereupon the spring 51 returns the push rod and the toggle joint to their respective operative positions. The contact members 61 and 62 are separated by the armature 56, and the magnetic circuit is then broken. The various parts are then in their respective normal positions ready for starting.

As in the modification shown in Figs. 1, 2 and 3, the operator cannot operate the shift rod 15 while the engine is running at a predetermined speed, and the gear mechanism is thus effectually protected against any inadvertence or mistake of the operator. In each of the forms of my invention, the mechanism is entirely automatic in its action to release the motor pinion from engagement with the flywheel gear teeth before a dangerous speed has been reached. The push rod 16 is retained in its inoperative position, flush or nearly flush with the floor or foot board, as the case may be, and out of the way of the operator while the engine is in operation.

Various modifications may occur to one skilled in the art, and it is understood that such changes may be made without departing from the spirit of my invention as may fall within the scope of the appended claims.

I claim as my invention:

1. The combination with a gear wheel, a second gear wheel shiftable into and out of mesh with said first gear wheel, and means for shifting said second gear wheel, of means for retaining a portion of said shifting means in its shifted position when said first gear wheel is rotating above a predetermined speed.

2. The combination with a gear wheel, a second gear wheel shiftable into and out of mesh with said first gear wheel, and means for shifting said second gear wheel, of means for locking a portion of said shifting means in its shifted position when the first gear wheel rotates above a predetermined speed, and means for releasing said locking means.

3. The combination with a gear wheel, a second gear wheel shiftable into and out of mesh with said first gear wheel, and means for shifting said second gear wheel, said means comprising a toggle joint, of means for tripping said toggle joint when a certain predetermined speed is reached by said gear wheels.

4. The combination with an engine shaft, a gear wheel operatively connected to said shaft, a second gear wheel, and means to shift said second gear wheel into and out of mesh with said first wheel, said means comprising two members connected by a toggle joint, of means for tripping said toggle joint when said engine shaft rotates at a predetermined speed, and means for preventing the closing of said toggle joint before the speed of the said engine reaches a predetermined minimum.

5. The combination with an engine shaft, a gear wheel on said shaft, a second gear wheel shiftable into and out of mesh with said first gear wheel, and means for shifting said second gear wheel; said means comprising a toggle joint, of means for tripping said toggle joint when the engine shaft rotates at a predetermined speed.

6. The combination with an engine shaft, a gear wheel on said shaft, a second gear wheel shiftable into and out of mesh with said first gear wheel, and means for shifting said second gear wheel, said means comprising a toggle joint, of means for tripping said toggle joint when the engine shaft rotates at a predetermined speed, and means for closing said toggle joint when said engine shaft rotates at a predetermined speed.

7. In combination, an engine shaft, a gear wheel operatively connected to said shaft, a second gear wheel, and means for shifting said second gear wheel into and out of mesh with said first gear wheel, said means comprising a manually operable member, and means for holding said member in its shifted position while said engine shaft rotates above a predetermined speed.

8. In combination, an engine shaft, a gear wheel operatively connected to said shaft, a second gear wheel, and means for shifting said second gear wheel into and out of mesh with said first gear wheel, said means comprising a manually operable member, and electrically controlled means for retaining said member in its shifted position while said engine shaft rotates above a predetermined speed.

9. The combination with an engine shaft, a gear wheel operatively connected to said shaft, a second gear wheel and means for shifting said second gear wheel into and out of mesh with said first wheel, said means comprising two relatively movable members shiftable together in one direction, and means for retaining one of said members in its shifted position when the first gear wheel rotates above a predetermined speed, of means for shifting said members separately in the opposite direction.

10. The combination with an engine shaft, a gear wheel operatively connected to said shaft, a second gear wheel, and means for shifting said second gear wheel into and out of mesh with said first gear wheel, said shifting means comprising two members, of means for retaining one of said members in its shifted position when said engine shaft rotates above a predetermined speed, and means for releasing said member when said engine shaft rotates below a predetermined speed.

In testimony whereof, I have hereunto subscribed my name this 14th day of March, 1913.

HOWARD L. BEACH.

Witnesses:
 EDWARD A. HAUFF,
 B. B. HINES.